Oct. 24, 1950     I. W. TURNER     2,527,468
FISHING LURE
Filed Dec. 18, 1946
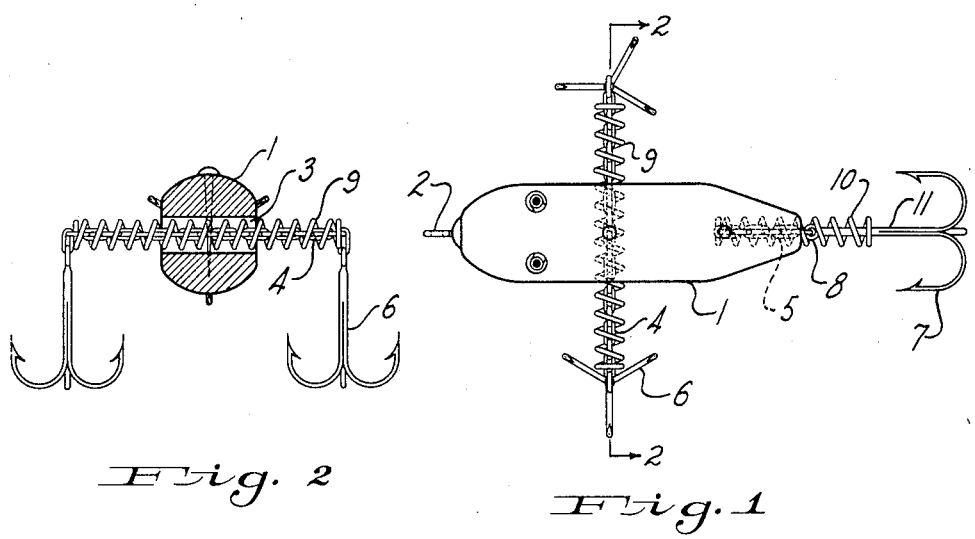

Patented Oct. 24, 1950

2,527,468

UNITED STATES PATENT OFFICE 2,527,468

FISHING LURE

Isaac W. Turner, Pittsburgh, Pa.

Application December 18, 1946, Serial No. 716,971

1 Claim. (Cl. 43—42.26)

This invention relates to new and useful improvements in fishing lures, and more particularly to improvements in the mounting and arrangement of the hooks in relation to the body of the lure, whereby they are most effective when the lure is struck by a fish.

It is among the objects of the invention to provide a means for mounting and holding hooks on lures to maintain them in a desired position when the lure is manipulated in the water.

Still another object of the invention is the provision of means for resiliently mounting a hook relative to the lure body whereby a desired position of the hook is maintained while permitting freedom of movement of the hook relative to the lure body when it is struck by the fish.

These and other objects of the invention will become more apparent from a consideration of the accompanying drawing, constituting a part hereof, in which like reference characters designate like parts, and in which Fig. 1 is a top plan view of a plug simulating the body of a fish having gang hooks mounted thereon embodying the principles of this invention, and Fig. 2 a cross-sectional view of the lure taken along the line 2—2, Fig. 1.

With reference to Figs. 1 and 2 of the drawing, numeral 1 designates the lure body commonly termed a plug which may be made of wood or other suitable material having an eye screw 2 for attachment to a line and having a transverse opening 3 and a bore in the stern for receiving pieces of chains 4 and 5 respectively. Gang hooks 6 are attached to the chain 4, as shown, and a gang hook 7 is attached to the chain 5 at 8, and without support these hooks would obviously drop. The chain 4 extends beyond the sides of the body 1.

In accordance with the present invention chains 4 and 5 are supported by coil springs 9 and 10, the spring 9 being of a diameter to be axially slidable in the bore 3 and extending to the links of the chain 4. The coil spring 9 has a length somewhat less than the length of chain 4. It functions to extend the hooks 6 away from the lure body 1 and to hold them in this position while the lure is traveling through the water while at the same time the gang hooks are resiliently mounted and will give when the fish strikes the lure. In the mounting of the tail hook 7, the spring 10 extends partially along the shank 11 of hook 7 to hold it in an extended position as shown. The hook being hinged on the chain link at 8, will yield when the lure 1 is struck by the fish from the rear as is commonly the case, thereby reducing the possibility of a miss when the fish strikes. In other words, the purpose of the resilient mounting of the gang hooks 6 and 7 is to place the hooks in an extended position without any interference with each other and to render the mounts yieldable to impact by the fish when the lure body is struck, so that the hooks will engage and hold the fish.

It is evident from the foregoing description of the invention that the improved mount of the hook either by a chain or links to artificial lures provides a simple and effective means of maintaining placement of the hook to aid in the effectiveness of the lure.

Although one embodiment of the invention has been herein illustrated and described, it will be evident to those skilled in the art that various modifications may be made in the details of construction without departing from the principles herein set forth.

I claim:

In a fish lure comprising a lure body having an opening extending therethrough, a chain passing through said opening and extending beyond the sides of the body, hooks fastened to the end links of the chain and depending downwardly from said body, and a coil spring extending through said opening and enveloping said chain to constitute a resilient support for the hooks, said coil spring having a length greater than the length of said opening and somewhat less than the length of said chain.

ISAAC W. TURNER.

REFERENCES CITED

The following references are of record in the file of this patent:

UNITED STATES PATENTS

| Number | Name | Date |
|---|---|---|
| 893,664 | Shakespeare | July 21, 1908 |
| 954,691 | Pflueger | Apr. 12, 1910 |
| 1,867,555 | Hildebrandt | July 19, 1932 |
| 2,159,230 | Sage | May 23, 1939 |
| 2,183,849 | Swanberg | Dec. 19, 1939 |
| 2,225,676 | White | Dec. 24, 1940 |
| 2,435,730 | Worden | Feb. 10, 1948 |

FOREIGN PATENTS

| Number | Country | Date |
|---|---|---|
| 393,514 | Great Britain | June 8, 1933 |